(12) United States Patent
Nikovski et al.

(10) Patent No.: US 9,637,111 B2
(45) Date of Patent: May 2, 2017

(54) METHOD AND SYSTEM FOR SELECTING POWER SOURCES IN HYBRID ELECTRIC VEHICLES

(71) Applicant: Mitsubishi Electric Research Laboratories, Inc., Cambridge, MA (US)

(72) Inventors: Daniel Nikolaev Nikovski, Brookline, MA (US); Amir massoud Farahmand, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 6 days.

(21) Appl. No.: 14/734,428

(22) Filed: Jun. 9, 2015

(65) Prior Publication Data
US 2016/0362096 A1 Dec. 15, 2016

(51) Int. Cl.
*B60W 10/08* (2006.01)
*B60W 20/11* (2016.01)
*B60W 10/06* (2006.01)
*G01C 21/34* (2006.01)

(52) U.S. Cl.
CPC ............ *B60W 20/11* (2016.01); *B60W 10/06* (2013.01); *B60W 10/08* (2013.01); *G01C 21/3469* (2013.01)

(58) Field of Classification Search
CPC ......... B60K 6/20; B60W 20/00; B60W 20/10; B60W 20/12
USPC .......................................................... 701/22
See application file for complete search history.

(56) References Cited

U.S. PATENT DOCUMENTS

| 7,954,579 | B2 * | 6/2011 | Rodriguez ............ B60W 10/08 180/65.265 |
| 8,190,318 | B2 | 5/2012 | Li et al. |
| 8,612,077 | B2 | 12/2013 | Phillips et al. |
| 8,731,752 | B2 | 5/2014 | Yu et al. |

(Continued)

OTHER PUBLICATIONS

Bertsekas, Dimitri P., "Neuro-Dynamic Programming: An Overview". <http://www.mit.edu/~dimitrib/NDP_Encycl.pdf> (1996).*

(Continued)

*Primary Examiner* — John Q Nguyen
*Assistant Examiner* — Anshul Sood
(74) *Attorney, Agent, or Firm* — Gene Vinokur; James McAleenan; Hironori Tsukamoto

(57) ABSTRACT

A method selects one or more power sources in a hybrid electric vehicle (HEV) at a particular moment in time for a current route to optimize energy consumption for the HEV, wherein the HEV includes one or more electric engines (EC) and one or more internal combustion engines, by first determining, in an off-line processor, a regression model that predicts a terminal cost of a state along a route from features associated with the route and the vehicle, using a computed true costs-to-go of multiple states from multitude of real or imaginary routes. In an online processor in the HEV, truncated dynamic programming is performed using the regression model to estimate a terminal cost at an end of a truncated time horizon for a current route. Then, one or more of the power sources are selected for the one or more EC and the one or more ICE based on a minimal cost-to-go of a current state.

6 Claims, 2 Drawing Sheets

(56) References Cited

U.S. PATENT DOCUMENTS

| | | | |
|---|---|---|---|
| 8,825,243 B2 | 9/2014 | Yang et al. | |
| 8,930,116 B2* | 1/2015 | Filev | B60K 31/00 701/94 |
| 2007/0010933 A1* | 1/2007 | Hochkirchen | B60W 10/26 701/117 |
| 2009/0259363 A1* | 10/2009 | Li | B60K 6/445 701/36 |
| 2012/0010768 A1* | 1/2012 | Phillips | B60L 11/123 701/22 |
| 2013/0332015 A1 | 12/2013 | Dextreit | |
| 2014/0095003 A1 | 4/2014 | Phillips et al. | |
| 2015/0039169 A1 | 2/2015 | Dextreit | |

OTHER PUBLICATIONS

D. V. Ngo, T. Hofman, M. Steinbuch, A. F. A. Serrarens, "An optimal control-based algorithm for hybrid electric vehicle using preview route information," American Control Conference (ACC), 2010.

V. Larsson, L. Johannesson, B. Egardt, and A. Lassson, "Benefit of route recognition in energy management of plug-in hybrid electric vehicles," American Control Conference (ACC), 2012.

V. Larsson, L. Johannesson, and B. Egardt, "Cubic spline approximations of the Dynamic Programming cost-to-go in HEV energy management problems," European Control Conference (ECC), 2014.

V. Larsson, L. Johannesson, B. Egardt, and S. Karlsson, "Commuter Route Optimized Energy Management of Hybrid Electric Vehicles," IEEE Transactions on Intelligent Transportation Systems, vol. 15, No. 3, 2014, pp. 1-10.

V. Larsson, L. Johannesson, and B. Egardt. "Analytic Solutions to the Dynamic Programming sub-problem in Hybrid Vehicle Energy Management," IEEE Transactions on Vehicular Technology, 2014.

Sciarretta et al. "Control of Hybrid Electric Vehicles," IEEE Control Systems Magazine, pp. 60-70. Apr. 2007.

\* cited by examiner

METHOD AND SYSTEM FOR SELECTING POWER SOURCES IN HYBRID ELECTRIC VEHICLES

FIELD OF THE INVENTION

The invention relates generally to optimizing energy consumption in a hybrid electric vehicle (HEV) including one or more electric motors (EM) powered by one or more electric power sources, and one or more internal combustion engines (ICE) powered by one or more fuel derived power sources (FP), and more particularly to selecting one or more of the power sources to drive the one or more of the EM and the one or more of the ICE.

BACKGROUND OF THE INVENTION

Typically, a hybrid electric vehicle (HEV) can be equipped with one or more electric motors (EM) powered by one or more electric power sources, e.g., batteries and fuel cells, etc., and an internal combustion engine (ICE) powered by fuel, e.g., gasoline, diesel fuel, etc, HEV are energy-efficient, cost-effective, and dependable. This is mainly due to the ability of the EM to regenerate energy during braking, which would otherwise be lost, and to store that energy into relatively less expensive batteries than the type of batteries installed in purely electrical vehicles, while also having the advantage of a long range, high reliability, and high energy density of the ICE.

For the HEV, an important question is when to use the EM or the ICE. It is known that the overall energy efficiency of the HEV can be improved significantly when the operation of the ICE and EM is coordinated carefully by taking into consideration the route the vehicle travels, e.g., geography, altitude, etc., and the conditions of the vehicle, e.g., velocity and state of charge (SoC) of the electric sources.

In such cases, it is necessary to select the source of motive power for the HEV. Typically, the ICE and EM have different efficiencies of converting electric or chemical energy into mechanical energy, which depends on the current driving conditions, such as speed, road inclination, required acceleration, etc. In addition, the decisions have to be made over a time horizon spanning an entire duration of a vehicle trip as depending on the conditions of the road and the vehicle.

For example, it may be more advantageous to conserve electric energy at a current time, and use the electric energy later, or vice versa. The necessity to make decisions for many points along the route makes this problem a hard combinatorial problem that requires computational resources far exceeding those available in computers onboard currently available in HEV.

Some example prior art methods that considered this issue include Ngo et al., "An optimal control-based algorithm for hybrid electric vehicle using preview route information," American Control Conference (ACC), 2010; V. Larsson, L. Johannesson, B. Egardt, and A. Lassson, "Benefit of route recognition in energy management of plug-in hybrid electric vehicles," American Control Conference (ACC), 2012; V. Larsson, L. Johannesson, and B. Egardt, "Cubic spline approximations of the dynamic programming cost-to-go in HEV energy management problems," European Control Conference (ECC), 2014; V. Larsson, L. Johannesson, B. Egardt, and S. Karlsson, "Commuter route optimized energy management of hybrid electric vehicles," IEEE Transactions on Intelligent Transportation Systems, Vol. 15, No. 3, 2014, pp. 1-10; V. Larsson, L. Johannesson, and B. Egardt. "Analytic solutions to the dynamic programming sub-problem in hybrid vehicle energy management," IEEE Transactions on Vehicular Technology, 2014.

U.S. Pat. No. 8,612,077 uses a Receding Horizon Control with a dynamic programming (DP) on a shorter than the original horizon. Instead of planning for all time steps, that method plans for a relatively short time horizon. The idea is to construct a smaller set of virtual segments from the original segments. In the set of virtual segments, all except the last are the same as the original segment starting from the vehicle's current segment. The last virtual segment, however, is a summary of the remaining original segments, and is characterized by the total length of segments left, the average speed of the vehicle, and the average grade of the remaining route segments. DP is applied to this set of virtual segments.

Most prior art solutions use fundamental optimization methods, such as dynamic programming or convex optimization to arrive at an optimal or close to optimal control policy for the two motors of an HEV. Savings in the amount of up to 17% have been estimated to be possible, see V. Larsson, L. Johannesson, and B. Egardt. "Analytic Solutions to the Dynamic Programming sub-problem in Hybrid Vehicle Energy Management," IEEE Transactions on Vehicular Technology, 2014.

Although true optimality is a very favorable feature of those methods, their computational complexity precludes the use of current embedded computational devices available in mass-produced vehicles. Furthermore, meticulous computation of the truly optimal control policy might not be necessary or even very accurate in light of the significant uncertainty in the driving conditions and energy consumption of the vehicle. For this reason, it is highly desirable to find computational methods that can approximate the optimal control policy and achieve most of the possible savings at a much lower computational cost. This allows deployment of methods on embedded devices comparable in computational speed to those currently used in engine control units (ECU).

A lower computational cost can be achieved when a much smaller optimization problem is solved in real time. Ideally, this problem should involve only variables and data pertaining to the current moment in time, or at most the immediately following decision periods. One example of such an approach is an equivalent consumption minimization strategy (ECMS). That strategy is based on the insight that whereas the cost of fuel is constant and known during the entire duration of the trip, the relative value of the electrical charge in the vehicle's battery is typically strongly time- and position-dependent. (If that was not the case, then the optimal policy would be trivial, that is, to always use the engine that is less expensive to operate, until its source of energy is completely depleted.) So, if the relative value of electrical charge can be estimated or approximated at all times, then a fast static optimization over only the current moment of time would be sufficient. The success of that approach depends on how accurately this relative value can be approximated.

The hybrid vehicle optimization problem can be formulated as an optimal control problem over a planning horizon of length $T_f$, where the only dynamic state variable $x(t)$ represents the state of charge (SoC) of the battery, usually normalized with respect to the battery capacity, such that $x(t) \in [0,1]$ is non-dimensional. The control signal $a(t)$ can be either discrete or continuous. In its simplest form, it is binary: $a(t) \in \{0,1\}$, where $a(t)=0$ represents a decision to use the electric motor (EM) at time t, and $a(t)=1$ represents the decision to use the ICE.

A more detailed control includes a choice of gear for the ICE. So for example, if $a(t) \in \{0, 1, 2, 3, 4, 5\}$, the choice of $a(t)=4$ signifies using the ICE in the fourth gear. An even more detailed control can consist of the power split ratio $\xi(t) \in [0,1]$ between the EM and ICE. In such a case, the variable $\xi(t)$ is usually again discretized into a set of integer values $a(t)$, at the desired resolution. One exception is V. Larsson, L. Johannesson, and B. Egardt. "Analytic Solutions to the Dynamic Programming sub-problem in Hybrid Vehicle Energy Management," IEEE Transactions on Vehicular Technology, 2014).

The run-curve of the vehicle, which is the altitude profile of the route and the speed of the vehicle along the route, is assumed to be fixed and known in advance.

In practice, the run-curve is determined by the selected route and the speed constraints along the route. Under this assumption, the system dynamics, e.g., battery charging and discharging, is described by a function $$\dot{x}(t)=g(x(t),a(t),t),$$

where g denotes the dependency of the rate of change of the SoC on its current level and the selected source of power.

In general, the function is time and position variant: when the slope of the road is steeper, and the EM is used, more electrical energy is expended to follow the run-curve. Conversely, when the vehicle is moving downhill, less electrical energy is expended, and when regenerative brakes are used, the change in the state of charge can be positive.

The objective of the vehicle energy management system for the HEV is to minimize the total energy consumption $$J^* = \min_{a(\cdot)} \left\{ c(x(T_f)) + \int_0^{T_f} c(x(t), a(t), t) dt \right\},$$

where $a(\cdot)$ is the control signal over the entire optimization period, $c(x(t), a(t), t)$ is the immediate cost of fuel (also time and position dependent), and $c(x(T))$ is the terminal cost expressing a penalty for leaving the battery less full than at the starting time $x(0)$, or a bonus for leaving it more charged. The running cost $c(x(t), a(t), t)$ can be obtained either by means of a vehicle simulator, or estimated from recorded vehicle performance data during actual operation of the vehicle. Typically, the terminal cost for the final state $c(x(T_f))$ is a linear or quadratic function of a difference in the state of charge between last and first state $$x(T_f)-x(0), \text{e.g.}, c(x(T))=w_1(x(T_f)-x(0))$$

for some constant $w_1 > 0$.

This optimization is subject to constraints on the state variables, for example $x(t)$ can be limited to be between 20%, and 80% of the maximum charge, in order to avoid damage to the battery.

Many solution methods to the hybrid vehicle optimization problem are known: A. Sciarretta and L. Guzzella, "Control of hybrid electric vehicles," IEEE Control Systems Magazine, 2007). Several principal approaches can be identified:

Dynamic Programming (DP)

A general approach is to use Dynamic Programming (DP). DP starts from discretizing time with a suitable discretization time step $\Delta t$. The result would be $T=T_f/\Delta t$ time steps. Then, the goal is to minimize the following cost function:

$$J^* = \min_{a(t)} \left\{ c(x(T)) + \sum_{t=1}^{T-1} c(x(t), a(t), t) \right\}.$$

It is known that one can solve this optimization problem using DP, e.g., V. Larsson, L. Johannesson, and B. Egardt, "Cubic spline approximations of the Dynamic Programming cost-to-go in HEV energy management problems," European Control Conference (ECC), 2014).

The optimal value function $V_t(x(t))$ can be defined as follows:

$$V_t(x_t) \triangleq \begin{cases} c(x(T)) & t=T \\ \min_a \{c(x(t)a) + V_{t+1}(x(t+1))\} & 1 \le t < T' \end{cases}$$

where $$x(t+1) = f(x(t), a(t), t) \stackrel{def}{=} \int_{\frac{T_f}{\Delta t}(t-1)}^{\frac{T_f}{\Delta t}t} g(x(\tau), a(t), \tau) d\tau.$$

These functions can be obtained by backward update, starting from time T and getting back to time t=1. Knowing the optimal value function is enough to determine the optimal controller.

There are two difficulties with this problem. The first is that when the number of time steps is very large, the computation time is high, and as a result, infeasible to be implemented on an onboard computer. The second problem is that because the state variable $x_t$ is continuous, one has to approximate the optimal value function. One approach is to discretize $x_t$. For the HEV problem, discretization in the order of thousands of individual states for each time step is usually sufficient to get good results.

Equivalent Consumption Minimization Strategies (ECMS)

The idea of this approach is to turn the sequential dynamic problem into a static optimization problem, by assuming that there is an equivalent cost of using charge of the battery, and comparing this cost with the cost of fuel, so that the engine that is less expensive is used at a given decision period. This method is very practical and easy to implement in an onboard computer. However, its main shortcoming is the need to know the equivalent cost of electrical charge. If the cost is assumed to be constant, and is higher than that of fuel, then only the ICE is used.

This is far from optimal, because the benefits of the EM are ignored. Conversely, if the electric cost is lower than that of fuel, only the EM is used until the battery is depleted to the lowest level allowed. Afterwards the vehicle switches to ICE, and returns to the EM only when some power is regenerated. This can deplete the battery, so the vehicle has to rely only on the ICE for the remainder of the trip. Clearly, this is far from optimal. Nevertheless, this strategy can be advantageous when the efficiencies of the ICE and the EM are different for different operating regimes, for example low speed and high speed.

SUMMARY OF THE INVENTION

A Hybrid Electric Vehicles (HEV) including one or more electric motors (EM) powered by one or more electric power sources (EP), and one or more internal combustion engines (ICE) powered by one or more fuel derived power sources (FP). The primary problem addressed by the invention is the high computational cost of solving a sequential decision making problem of deciding when to use the EP or the FP at any instant in time along a route.

Prior art solutions discretize the dynamic variable of the problem, i.e., the battery's state of charge (SoC), into, e.g., thousands, of discrete states, and apply dynamical programming (DP) to the discretized problem, over multiple, e.g., hundreds or thousands, of decision stages. This is very slow, and impractical for state of the art onboard computers.

The embodiments of the invention provide a method for selecting either the EP or the FP at a particular moment in time to optimize energy consumption.

The embodiments consider only a small number of decision stages, e.g., only one, and replace a true future cost of the trip, which depends on the remaining electrical charge in the battery, with an approximate estimate, obtained by means of machine learning techniques. This approximate estimate can be obtained offline, based on exact calculations for multiple hypothetical trips over many alternative routes with various characteristics, but under the same cost structure, e.g., electricity and fuel costs for the vehicle.

DETAILED DESCRIPTION OF THE EMBODIMENTS OF THE INVENTION

Figure 1:
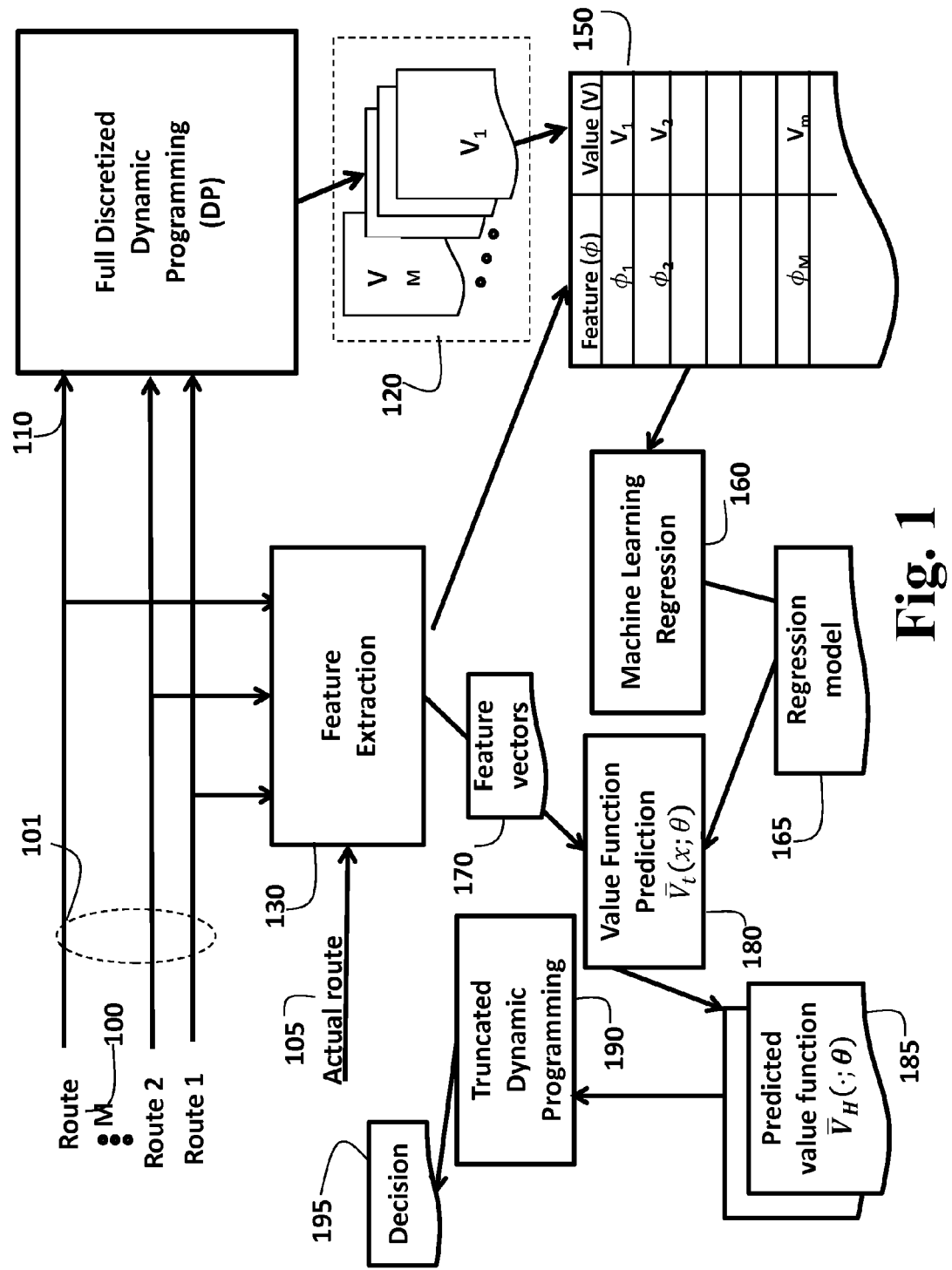
FIG. 1 is a schematic of a method for optimizing energy consumption in a hybrid electric vehicle (HEV)

The embodiments of our invention optimize energy consumption in a hybrid electric vehicles (HEV) including one or more electric motors (EM) powered by one or more electric power sources (EP), and one or more internal combustion engines (ICE) powered by one or more fuel derived power sources (FP), and more particularly to a method for selecting either the EP or the FP.

The invention is based in part on a realization that HEV can be manufactured in numerous configuration of engines and motor, hence to the task to provide an engine selection method that apply to all possible configurations is difficult. Therefore, the invention does not focus on engine or motor selection, ignoring any particular configuration, but rather focusing on which of the available power source to use at any point in time along a route in which the HEV is traveling.

The embodiments describe an approach that has a similar computational complexity as an equivalent consumption minimization strategy (ECMS), while approaching an optimality of solutions obtained with dynamic programming (DP). The idea is based on the realization to avoid a long recursive computation of DP from a time t=T back to time t=1.

Instead, we consider a much shorter decision time horizon H, where H<<T, for example, H is 1 or 2, and T is 1000, which can be extended periodically in a rolling horizon manner. The key is to recognize that the structure of the problem remains the same, when we use the cost-to-go at time H as the terminal cost $$J^* = \min_{a(t)} \left\{ c(x(T)) + \sum_{t=1}^{T-1} c(x(t), a(t), t) \right\}$$

-continued
$$= \min_{a(t)} \left\{ V_H(x(H)) + \sum_{t=1}^{H-1} c(x(t), a(t), t) \right\}.$$

That is, we can make the optimal decisions for the period until time t=H, when we use $V_H(x(H))$ as a new terminal cost. Unfortunately, the only way to determine $V_H(x(H))$ exactly is to do the backward DP recursion from time T to H, which is the main computational expense that we desire to eliminate.

However, it can be expected that the exact terminal cost for the truncated problem $V_H(x(H))$ can be approximated by another function $\bar{V}_H(x(H))$ that is much easier to determine. We learn the new terminal cost $\bar{V}_H(x(H))$ with machine learning techniques.

Terminal Cost Approximation from Route Features

The method uses DP to solve offline the energy optimization problem for multiple different routes, with their associated run-curves, possibly on a powerful dedicated computer. Then, we use a regression procedure to learn the mapping from some features of the run-curve, time, and the state of the charge of the battery (SOC) to the optimal value function. Any regression procedure can be used, including, but not limited to, ordinary least squares, ridge regression, Least Absolute Shrinkage and Selection Operator (Lasso), decision trees, regularized least-squares regression defined in a reproducing kernel Hilbert space (RKHS), deep neural networks, K-nearest neighbor regression, etc. Because this step is determined offline, the computational cost does not put a burden on the onboard vehicle computer.

As shown in FIG. 1, the method starts by generating multiple routes 100 offline, and determining corresponding run-curves 101, either by collecting real data or by simulation. We denote these run-curves, which are defined by parameters, such an altitude profile $(alt)_1^T$ of the route, and a profile of a velocity $(\upsilon)_1^T$ of the vehicle, by a run-curve representation vector θ. Often, the vector θ is high-dimensional, i.e., its dimension is 2T or more. Therefore, we extract some features from θ by means of a feature extraction block 130. The feature mapping takes the parameter θ, the SoC x, and time t as input, and generates a potentially lower-dimensional vector φ(x, t, θ) as output. Below, we describe the exact nature of the features used in the preferred embodiment.

For each run-curve, we use conventional DP 110 to determine offline the optimal value functions $V_t(x; θ)$ 120 of each imaginary route. We randomly select a large number of run-curves $θ_i$. For each run-curve, we randomly select a large number of states of charge $X_{ij}$ and time steps $t_{ij}$, and construct a dataset 150, where each row contains a feature vector φ, and a value V for a corresponding vehicle state:

$$D = \{(\phi(X_{ij}, t_{ij}, \theta_i), V_{t_{ij}}(X_{ij}; \theta_i))\}_{ij}.$$

Then, we use a machine learning regression method to learn regression model 165 mapping inputs $(X_{ij}, t_{ij})$ to outputs $V_{t_{ij}}(X_{ij}; θ_i)$. The result is a predictive value function $\bar{V}_t(x; θ)$ 180. In the preferred embodiment of the invention, the RKHS-based regularized least squares regression estimator is used in the machine learning regression block 160. However, other regression estimators can also be used.

The regularized regression in the preferred embodiment solves the following problem:

$$\bar{V} \leftarrow \operatorname*{argmin}_{h \in F} \frac{1}{|D|} \sum_{i,j} |h(\phi(X_{ij}, t_{ij}, \theta_i)) - V_{t_{ij}}(X_{ij}; \theta_i)|^2 + \lambda L(h),$$

where F is the set of value functions, L (h) is the regularization functional, which allows us to control the complexity, and λ>0 is a regularization coefficient. The regularizer L (h) measures the complexity of function h. Different choices of F and L are possible. For example, in one embodiment of the approach, we select F to be a reproducing kernel Hilbert space. In this case, $L(h)=\|h\|_F^2$ is the norm of the function in the RKHS. The result is a function $\overline{\nabla}$ that takes the SoC x, the time t, and the run-curve θ, and the feature map φ, and outputs an approximation of the optimal value function $V_t(x)$ for the particular run-curve. In the case of RKHS-based regularized regression, the function $\overline{\nabla}$ has a linear form and can be written as $$\overline{V}(x, t, \theta) = \sum_{ij} k(\phi(X_{ij}, t_{ij}, \theta\_i), \phi(x, t, \theta))\alpha_{ij},$$

where k is the kernel corresponding to the chosen RKHS, and $a_{ij}$ are the parameters that can be determined in a closed-form by solving the optimization problem.

The key to success in this approach is to select a set of features φ, such that sufficient information from the run-curve is acquired, while having a low-dimensional representation of the route.

To define the features precisely, we define the following notations.

For a vector $u \in \mathbb{R}^M$, we define a finite difference vector $\Delta u=(u_2-u_1, \ldots, u_M-u_{M-1})$. We denote $u_{t:T}$ as the subsequence of u from time t to T. The vector $(u)_+$ has positive components of u, and the vector $(u)_\times$ has negative components.

In the preferred embodiment, we use the features $$\phi(x,t,\theta)=(\phi^{(1)}(x,t,\theta), \ldots, \phi^{(7)}(x,t,\theta))$$

determined over the run-curve for the remainder of the route.
1. $\phi^{(1)}=\text{alt}_T-\text{alt\_t}$. This feature describes the altitude change from time t to the end of the route. This value is highly correlated with the energy power consumption.
2. $\phi^{(2)}=\|(\Delta\text{alt}_{t:T})_+\|_2$. This feature is the increase in the altitude from time t to the end of the route.
3. $\phi^{(3)}=\|(\Delta\text{alt}_{t:T})_-\|_2$. This feature is the decrease in the altitude from time t to the end of the route.
4.

$$\phi^{(4)} = \frac{1}{T-t+1}\|v_{t:T}\|_1.$$

This feature is an average velocity of the vehicle from time t to end of the route.
5.

$$\phi^{(5)} = \frac{1}{T-t+1}\|v_{t:T}\|_2^2.$$

This feature is an average squared velocity of the vehicle from time t to the end of the route, and the air resistance is proportional to the squared velocity of the vehicle.
6. $\phi^{(6)}=T-t$. This feature encodes the current time.
7. $\phi^{(7)}=x_t$. This feature is the state of the charge (SOC) of the battery at time t.

Learning $\overline{\nabla}_t(x; \theta)$ can be computationally complex. However, because it is done offline, and not in the onboard computer of the vehicle, this is not a concern. After the regression model parameters 165 have been estimated (e.g., the coefficients $\alpha_{ij}$ for RKHS regression), they are uploaded to the vehicle.

After the function $\overline{\nabla}$ is learned, when the HEV travels according to a run-curve for an actual route 105 parameterized by features θ, and the HEV has a particular state, the procedure determines the feature vector 170 for that particular state, and uses the learned value function 180 to determine an approximated value function $\overline{\nabla}_H(\cdot; \theta)$ 185 for any future time.

After that, for the current time t=1, the method solves a truncated DP problem 190 only for H time steps, using $\overline{\nabla}_H(x; \theta)$ as the new terminal cost at time H. It then executes the first control command a(1) as the decision 195 about which of the one or more power sources to use. At time t=2, the method solves the DP for another H time steps (from time t=2 to H+1), using $\overline{\nabla}_{H+1}(x; \theta)$ as the new terminal cost. The method then execute the first control command a(2).

This process repeats in a receding horizon manner until the vehicle reaches time step T–H. Afterwards, the method only plans until the time horizon T, such that the planning time horizon gradually decreases.

Figure 2:
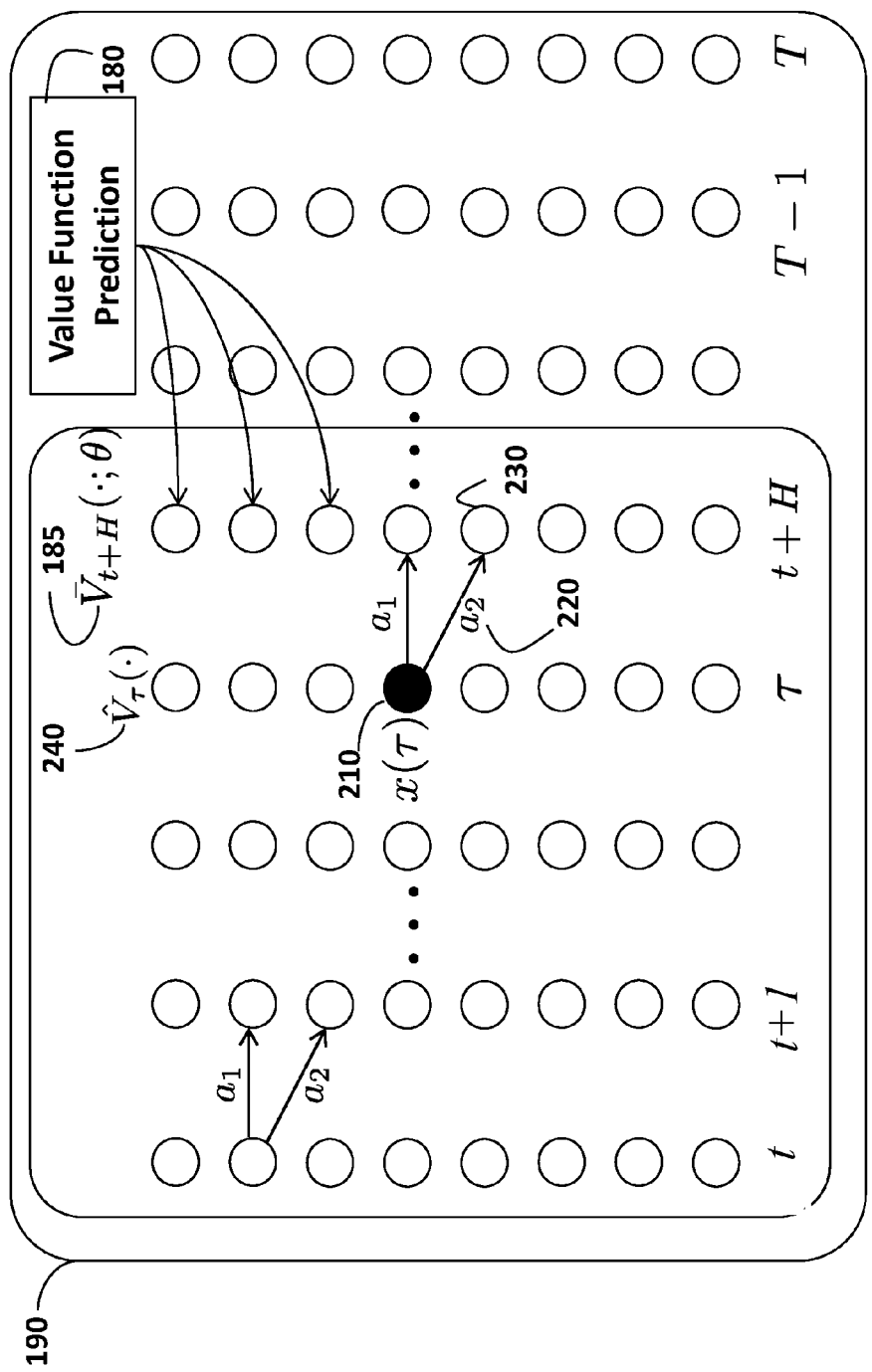
FIG. 2 is a flow diagram of an online phase of the method.

As shown in FIG. 2, the online phase of the method, which is performed in an onboard computer vehicle, is summarized as follows:
For time t=1 to T–H, repeat:
  For stage τ=t+H to t+1, proceeding backwards, repeat:
    For each state x(τ) 210 of stage τ, determine its approximate value function $\hat{V}_\tau(x(\tau))$ 240 as follows:
      If τ=t+H (i. e., this is the terminal stage), set $\hat{V}_\tau(x(\tau))=\overline{\nabla}_{t+H}(x(t+H); \theta)$, obtaining the predicted value function $\overline{\nabla}_{t+H}(x(t+H); \theta)$ 185 by means of value function prediction 180 and the learned predictive model 165;
      Else, if τ<t+H (i. e., this is not the terminal stage), set $\hat{V}_\tau(x(\tau))=\min_a\{c(x(\tau), a)+\hat{V}_{\tau+1}(x(\tau+1))\}$, where minimization is performed over all actions a 220 that are possible in state x(τ), and x(τ+1) is the resulting successor state 230 under that action, that is x(τ+1)=f(x(τ), a, τ)
At the current SoC x(t), select $$a(t)=\text{argmin}_a\{c(x(t),a)+\hat{V}_{t+1}(f(x(t),a,t))\};$$

Execute control command a(t).

Note that when t+H>T, we simply select a new time horizon H', such that t+H'=T.

We also note that the current formulation is not limited to deterministic systems. The only required change to deal with stochastic dynamics is to replace $\min_a\{c(x(\tau), a)+\hat{V}_{\tau+1}(x(\tau+1))\}$, and other similar terms, for selecting the control signal a(t)) with $\min_a\{E[c(x_t, a)+\hat{V}_{\tau+1}(X_{\tau+1})]\}$, in which $E[\cdot]$ represents an expectation operator, and the successor state $X_{\tau+1}$ is now a random variable that can take on multiple values with different probabilities. Calculating this expectation requires knowledge of the stochastic components of the system, for example the uncertainty in the run curve that the vehicle will follow for a given actual route.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:
1. A method for selecting one or more power sources in a hybrid electric vehicle (HEV) at a particular moment in time for a current route to optimize energy consumption for the HEV, wherein the HEV includes one or more electric engines (EC) and one or more internal combustion engines (ICE), comprising off-line and on-line steps:

determining, in an off-line processor, a regression model that predicts a terminal cost of a state along a route from features associated with the route and the vehicle, using a computed true costs-to-go of multiple states from multitude of real or imaginary routes;

performing, in an online processor in the HEV, truncated dynamic programming, using the regression model to estimate a terminal cost at an end of a truncated time horizon for a current route; and selecting and applying a power source of each of the one or more EC and the one or more ICE based on a minimal cost-to-go of a current state, wherein the regression model is learned by means of machine learning methods from a dataset of examples comprising pairs of route features of multiple states and the computed true costs-to-go of the multiple states, wherein the features represent an altitude change, an increase in altitude, a decrease in altitude, an average velocity, an average squared velocity, and a remaining time from the particular moment in time to an end of the route, as well as a current state of charge.

2. The method of claim 1, where the machine learning methods include at least one of ordinary least squares, ridge regression, least absolute shrinkage and selection operator (LASSO), decision trees, regularized least-squares regression defined in a reproducing kernel Hilbert space (RKHS), deep neural networks, and k-nearest neighbor regression.

3. The method of claim 1, where the costs-to-go of a vehicle state are determined by full dynamic programming over an entire route from that state to the end state that corresponds to the final destination of the vehicle.

4. The method of claim 1, where states and their respective costs-to-go are computed over a multitude of real or imaginary routes selected from the primary geographic area where a vehicle is operated.

5. The method of claim 1, where a transition costs between states that are used during full or truncated dynamic programming are determined according to a simulation model.

6. The method of claim 1, where transition costs between states that are used during full or truncated dynamic programming are determined according to performance data recorded during operation of the vehicle.

* * * * *